W. BIRD.
DEMOUNTABLE TIRE RIM.
APPLICATION FILED MAR. 15, 1918.
1,291,378.
Patented Jan. 14, 1919.
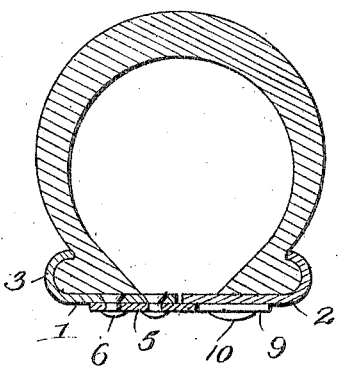
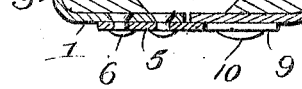
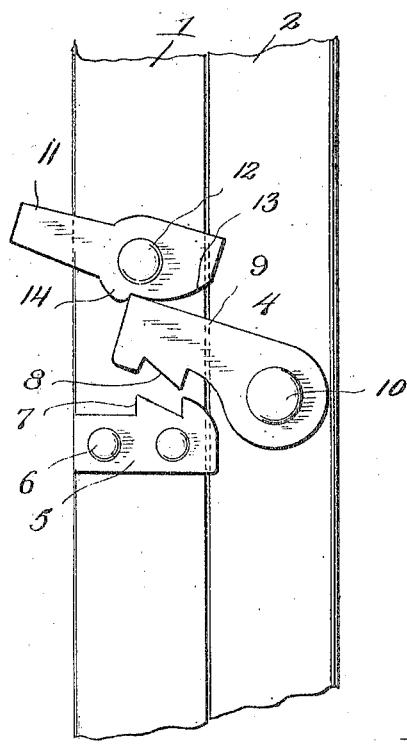
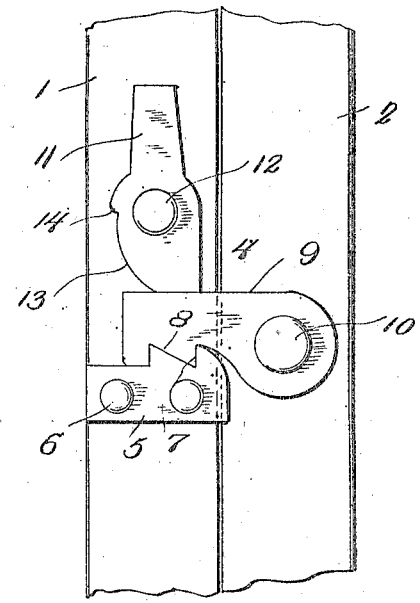
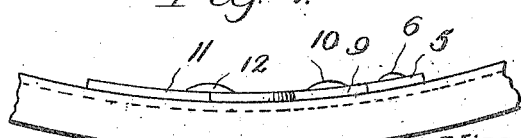

UNITED STATES PATENT OFFICE.

WILLIAM BIRD, OF VANPORT, PENNSYLVANIA.

DEMOUNTABLE TIRE-RIM.

1,291,378.  Specification of Letters Patent.  Patented Jan. 14, 1919.

Application filed March 15, 1918.  Serial No. 222,688.

*To all whom it may concern:*

Be it known that I, WILLIAM BIRD, a citizen of the United States, residing at Vanport, in the county of Beaver and State of Pennsylvania, have invented new and useful Improvements in Demountable Tire-Rims, of which the following is a specification.

This invention relates to a demountable tire rim and has for its primary object to provide a tire rim that may be more quickly associated with the tire and in such a manner that the ordinary tire tools may be dispensed with.

An object of the invention is to provide a rim the locking devices of which are permanently connected to the rim so as to always be in place to be operated.

A feature of my invention is the location of the clamping device so that the same will be protected against being mutilated.

Besides the above my invention is distinguished in the manner of constructing and arranging the members of the locking device so that the rings may be effectively held in engagement with each other and readily forced apart when removing the tire.

With these and other objects in view the invention will be better understood from the following detailed description taken in connection with the accompanying drawing wherein;

Figure 1 is a vertical sectional view of my invention connected to the tire.

Fig. 2 is a detailed view of a portion of the rim showing the locking device in open position.

Fig. 3 is a similar view with the parts in locking position.

Fig. 4 is a detailed side elevation of the rim.

At the start I wish to call attention to the fact that any number of locking devices may be used although the following description will be limited to a single locking device. The rim consists of a pair of rings 1 and 2 each having one edge rolled back to form a clencher flange 3 for engaging the bead of the tire, the remaining edges of the rings are arranged opposite each other for moving toward and away from each other.

As far as I have proceeded it will be seen that the rings may be readily arranged in engagement with the tire and squeezed toward each other for bringing the tire into its proper shape and position with relation to the rim. For the purpose of effectively holding the rings in engagement with each other and against circumferential movement with relation to each other I provide a plurality of locking devices 4 only one of which is illustrated in the drawing. This locking device consists of a plate 5 riveted to the ring 1 as indicated at 6 and provided with teeth 7. Adapted to coöperate with the teeth 7 are similarly formed teeth 8 on a dog 9 that is pivotally connected to ring 2 as indicated at 10. From this arrangement it will be seen that when the teeth of the dog are arranged in engagement with the teeth of the plate the rings will be held against lateral movement with relation to each other and thus the clencher flanges are effectively held against movement out of engagement with the rim when the inner tube is inflated. For the purpose of preventing disengagement between the plate and dog and further to prevent circumferential movement of the rings with relation to each other I provide a lever 11 rotatably mounted upon a rivet 12 carried by the ring 1 and this rivet 12 is so disposed that the strain of the dog 9 tending to move to an open position will be exerted in a direction in alinement with the center of the rivet with a result that there will not be any tendency for the lever to rotate on the rivet 12. For the purpose of forcing the dog forward into engagement with the plate the lever is provided with a cam surface 13 acting against the dog. The lever is further provided with a lug 14 engaging the dog 9 in a manner to force the rings apart when the lever is pressed in an opposite direction to which it would be pressed when forcing the dog into engagement with the plate.

From the foregoing description it should be apparent that I provide a rim of substantial construction that may be very quickly connected to a tire and disconnected therefrom without the necessity of using a separate tool, and besides, the clamping device is completely housed between the rim and the felly of the wheel so that objects will be prevented from mutilating the locking devices.

Having described my invention, what I claim is:

A demountable tire rim comprising a pair of rings for engagement with a tire, a tooth plate riveted to one ring, a tooth dog riveted to the other ring and adapted to engage said plate and a pivoted lever having a cam surface engaging the dog for forcing the same into engagement with the plate and further provided with a lug adapted to engage the dog for forcing the rings apart after the dog has been separated from the plate, said plate being of a length great enough to partly overlap both rings.

In testimony whereof I affix my signature.

WILLIAM BIRD.